United States Patent [19]
Guckenberger et al.

[11] 3,850,838
[45] Nov. 26, 1974

[54] DISPERSIBILITY OF WATER-SOLUBLE GUMS

[75] Inventors: John D. Guckenberger, Collinsville, Ill.; Dudley S. Titus, St. Louis, Mo.; Knut Toft, Dramen, Norway

[73] Assignee: Mallinckrodt, Inc., St. Louis, Mo.

[22] Filed: July 10, 1972

[21] Appl. No.: 270,211

Related U.S. Application Data

[63] Continuation-in-part of Ser. No. 70,510, Sept. 8, 1970, abandoned.

[52] U.S. Cl. ............... 252/363.5, 252/316, 424/359, 424/361, 424/362, 424/363, 426/96, 426/103, 426/167, 426/169, 426/285, 426/453
[51] Int. Cl. ............................................. B01f 3/12
[58] Field of Search ...... 252/363.5; 99/139; 426/96, 426/103, 167, 169, 285, 453

[56] References Cited
UNITED STATES PATENTS
2,768,143  10/1956  Henry ............................. 252/363.5
2,992,188  7/1961  Miller et al. ...................... 252/363.5

*Primary Examiner*—Richard D. Lovering
*Attorney, Agent, or Firm*—John D. Pope, III

[57] ABSTRACT

Readily dispersible and dissoluble forms of alcohol-insoluble hydrocolloids such as sodium alginate and other water-soluble gums may be prepared by incorporating the comminuted hydrocolloid in agglomerated granules by means of a carbohydrate binder that is soluble in both alcohol and water, e.g., sucrose, dextrose or corn syrup solids. An aqueous alcoholic medium is used to dissolve the binder so that it coats the particles of hydrocolloid without hydrating them. When the wetted mixture is stirred or tumbled in a suitable mixer, the particles stick together and form agglomerated granules. Other agents such as coloring agents, flavoring agents, minerals and salts may be incorporated in the granules.

3 Claims, No Drawings

DISPERSIBILITY OF WATER-SOLUBLE GUMS

This application is a continuation-in-part of our copending application Ser. No. 70,510, filed Sept. 8, 1970, now abandoned.

BACKGROUND

Numerous water-soluble gums such as gum acacia, karaya, tragacanth, and carrageen are widely used as additives to increase the viscosity of various aqueous preparations, particularly food, pharmaceutical and cosmetic preparations. Often these gums, together with other substances, are incorporated in a dry mixture which is subsequently dispersed or dissolved in water by a housewife with the aid of such mixing devices as are commonly found in the home.

These water-soluble gums, or "hydrocolloids" as they will be referred to herein, are characterized by their ability to absorb water and swell and eventually to form more or less viscous solutions. A dispersion and dissolution of the pure hydrocolloid is ordinarily slow and difficult even when the hydrocolloid is finely comminuted or shredded. In the latter case the products are dusty and very difficult and unpleasant to handle because of the inherently sticky character of these products. Also, as these hydrocolloids absorb moisture and swell they become sticky and the individual particles join together to form clumps or aggregates. Ordinary stirring is usually insufficient to disperse and dissolve these aggregates, and vigorous agitation with a device which provides a shearing effect is necessary.

In order to hasten and facilitate dispersion and dissolution of these hydrocolloids various expedients have been suggested and employed. For example, they are sometimes mixed with relatively large amounts of some readily soluble substance such as sugar. However, because of differences in density and particle size, dry mixtures of this sort are subject to separation. While admixtures of soluble substances such as sugar are of some value in aiding dispersion of the hydrocolloid particles, they are not effective unless excessively large amounts are employed. Finally, such large amounts of sugar may be objectionable in many products such as dietetic foods.

Another stratagem which has been employed is to treat the comminuted hydrocolloid, e.g., sodium alginate, with steam in a tumbling device whereby the particles are partially hydrated and formed into granular agglomerates which are then dried. It is said that hydrocolloids treated in this manner are substantially more readily and quickly dispersible and dissoluble in water than the original untreated material. Owing to the substantial increase in the size of the hydrocolloid particles after this treatment, extended mixing or agitation is still necessary to completely disperse and dissolve the hydrcolloid. Grinding these agglomerates is of some benefit, but the products then have the dusty sticky character of the original comminuted colloid.

Among the objects of the present invention may be noted the provision of novel hydrocolloid compositions in the form of agglomerated granules which are substantially dust-free and which are more readily and quickly dispersible and dissoluble in water than similar compositions known heretofore; the provision of methods for preparing heterogeneous compositions of the character described comprising a hydrocolloid and a complexing agent which reacts with the hydrocolloid in water to form a permanent gel; the provision of methods for preparing compositions of the character described in which the hydrocolloid is the major component; and the provision of methods of the character described which do not substantially increase the particle size or otherwise significantly alter the intrinsic properties of the hydrocolloid itself. Other objects and features will be in part apparent and in part pointed out hereinafter.

The invention accordingly comprises the products and methods hereinafter described, the scope of the invention being indicated in the following claims.

SUMMARY OF THE INVENTION

The invention is directed to methods for preparing alcohol insoluble hydrocolloids in the form of readily dispersible and soluble agglomerates. The process comprises intimately combining the hydrocolloid with a carbohydrate binder that is soluble in both water and alcohol and an aqueous alcoholic solvent for the said carbohydrate, granulating the resulting mixture, and then drying the resulting agglomerated granules.

The invention is also directed to readily waterdispersible colloidal thickening agents in the form of agglomerated granules comprising discrete particles of a comminuted alcohol-insoluble hydrocolloid coated with and united by means of a carbohydrate binder which is soluble in both water and in alcohol.

DESCRIPTION OF THE PREFERRED EMBODIMENTS

The present invention is applicable to any of the alcohol-insoluble hydrocolloid materials commonly used to increase the viscosity of various food, pharmaceutical and cosmetic formulations, both naturally occurring products and synthetics. Examples of such materials are alginic acid and water-soluble salts thereof such as sodium alginate, karaya, tragacanth, carrageen, guar and carboxymethyl cellulose. The alcohol-soluble binder may be carbohydrate such as sucrose, dextrose, dextrin, maltose, lactose, fructose and the like or a mixture of carbohydrates such as corn syrup solids. If desired, other agents may be incorporated in the agglomerated granules along with the gum and the carbohydrate binder.

The water-soluble gum, the carbohydrate binder and the alcoholic solvent may be combined in various ways. For example, a dry mixture of the gum and binder may first be prepared. This mixture may then be granulated with the aid of alcohol in a twin-shell or ribbon blender. Alternatively the binder may first be dissolved in the alcohol and the resulting solution mixed with the powdered gum as before.

The proportions of hydrocolloid and carbohydrate may be varied within wide limits depending in part upon the properties of the materials employed and the purpose for which the product is to be used. As little as 5 percent of the binder based on the weight of the composition is ordinarily sufficient, but for some purposes the granules may advantageously contain as much as 95 percent of the binder.

In general, the aqueous alcoholic solution should contain sufficient alcohol to prevent hydration of the hydrocolloid but not so much that it prevents dissolution of the binder material. Sodium alginate is soluble in aqueous ethanol solutions containing less than about 30 percent ethanol, but when the solution also contains corn syrup solids or other binders the minimum alcohol concentration is reduced, e.g., to as low as 24 percent. The maximum concentration of alcohol in the granulating medium is determined by the solubility characteristics of the binder material employed. In the case of corn syrup solids, the latter may separate if the alcohol concentration is greater than about 38 percent. Appropriate limits can be readily determined for other binder materials. In general the preferred alcohol concentration is within the limits of 25 and 30 percent.

In most instances it is convenient to dissolve the binder, e.g., corn syrup solids, in the aqueous alcohol solution. If on the other hand, the desired composition contains more of a suitable carbohydrate, e.g., sucrose, than is required to serve as a binder, then it may be more convenient to prepare a dry mixture of the hydrocolloid and the carbohydrate, and wet and tumble this mixture with a suitable amount of aqueous alcohol solution. In that case only a portion of the carbohydrate is dissolved. It has been noted that the proportion of alcohol required to prevent hydration of the hydrocolloid is less when it is mixed with a large proportion of sugar.

The coating of the carbohydrate binder on the hydrocolloid particles need not be and preferably is not continuous. In most instances the porous agglomerates of the present invention are made up of finely divided particles of the hydrocolloid held together by finely divided particles of the carbohydrate binder.

The following examples illustrate the invention.

EXAMPLE 1

The following example illustrates the use of the invention to prepare a readily dispersible and dissoluble and substantially dust-free granular form of sodium alginate which contains just sufficient binder to coat the hydrocolloid particles and form the desired granules.

The 1500 g. sodium alginate in a twin-shell blender equipped with an intensifier bar was uniformly added with continuous agitation 1000–1500 g. of a solution having the composition (by weight):

| | |
|---|---|
| 30% Aqueous solution of corn syrup solids | 75% |
| Ethanol USP | 25% |

The addition and mixing were continued until the sodium alginate was uniformly wetted and had formed granular agglomerates. The quantity of the alcololic solution required will vary somewhat depending upon the particle size, and hence the surface area to be coated, of the sodium alginate. The agglomerates were removed from the blender and dried. Drying may be accomplished by exposing the granules to air at room temperature or by heating them in a suitable oven. For most purposes products containing 10–20 percent corn syrup solids are satisfactory.

Using identical mixing conditions to prepare 1 percent solutions, this granulated product was compared with the original sodium alginate and a commercially available sodium alginate which has been granulated by a conventional method using steam or water. The product granulated as above required only 2 minutes for complete solution, whereas the original sodium alginate required 30–40 minutes and the conventional granular material required 10–15 minutes.

EXAMPLE 2

Hydrocolloids are frequently used in combination with a complexing agent, e.g., sodium alginate and a calcium salt, which interact in water to form an insoluble gel. Such mixtures obviously cannot be granulated by conventional methods employing steam or water. However, such mixtures are readily agglomerated using the present invention. The resulting granular products exhibit the same ease of dispersion and dissolution as the previously described product.

A stabilized sodium alginate mixture used in dessert gel products has the following composition (by weight):

| | |
|---|---|
| Sodium alginate | 62.6% |
| Calcium tartrate | 16.9% |
| Disodium citrate | 20.5% |

This mixture was wetted and agglomerated with 800 g. of a solution having the same composition and in the same manner as that described in Example 1.

This mixture could not be granulated by the methods known heretofore because if wetted the sodium alginate would react with the calcium tartrate to form a calcium alginate gel. However, when agglomerated by the method disclosed herein the sodium alginate is not hydrated and therefore does not react with other components in the mixture. It will be evident to those skilled in the art that many other useful additives in addition to or in place of calcium tartrate may be incorporated in the granular compositions of the present invention. Such additives might for example be coloring agents, flavoring agents, preservatives, vitamins, mineral fortifiers, antioxidants, sequestrants, and the like.

EXAMPLE 3

For granulating hydrocolloid compositions containing large amounts of sugar, such as so-called instant desserts, the following variation of the invention is feasible and frequently more convenient. Essentially it comprises adding a sufficient amount of an aqueous alcohol solution to preferentially dissolve enough of the sugar to coat the remaining hydrocolloid and undissolved sugar particles in the same manner as before.

A dry uniform mixture containing 94.5 percent by weight of fine granular sucrose and 5.5 percent sodium alginate was first prepared. This dry mixture was then wetted and granulated as before with a solution consisting of 50 percent USP ethanol and 50 percent distilled water, the amount of this solution being 3–6 percent of the dry mixture. When the sugar-alginate mixture was uniformly wetted and agglomerated it was removed from the blender, dried and sieved as before. The resulting granular product showed the same ease of dispersion and dissolution as the previously described products.

EXAMPLE 4

The same procedure can be applied to compositions containing a complexing agent in addition to the hydrocolloid.

A physical mixture having the following composition was first prepared.

| | |
|---|---|
| Sugar (Sucrose) fine granular | 92.68% |
| Sodium alginate | 5.45% |
| Calcium tartrate | 1.46% |
| Sodium citrate | .36% |
| Sodium saccharin | .05% |

This mixture was then blended in a twin-shell or ribbon blender provided with means for liquid addition. To the resulting uniform dry mixture was then added with continuous agitation a solvent consisting of 50 percent USP alcohol and 50 percent distilled water. This addition was continued until the liquid concentration was 3–6 percent and the product was uniformly wetted and granular agglomerates were formed. The granulated product was dried and then sieved to approximately 30 mesh or larger.

A simple unagglomerated mixture having the above composition can be dispersed in water only with difficulty. It tends to form lumps readily unless it is stirred quickly. Considerable force is also necessary because of the increasing viscosity and eventual gelling of the dispersion. While a mechanical mixer equipped with a wire or egg beater is helpful, it is difficult to achieve complete dispersion and dissolution of the hydrocolloid before a permanent gel begins to form. Moreover, substantial amounts of air are then incorporated in the product and for many products, such as for example dessert gels, this entrapped air is objectionable.

When, however, the same mixture is agglomerated with the aid of alcohol as described above, the resulting granulated hydrocolloid is quickly and easily dispersed in water. Only moderate stirring with a spoon is necessary to completely disperse and dissolve the components before there is any substantial interaction between the hydrocolloid and the calcium tartrate. Moreover, the granules are essentially dust-free and are easily handled.

EXAMPLE 5

To 1500 g. CMC (carboxymethyl cellulose) in a twin-shell blender equipped with an intensifier bar was uniformly added with continuous agitation 1500–2000 g. of a solution having the composition by weight:

| | |
|---|---|
| 20% aqueous solution of corn syrup solids | 69.3% |
| Ethanol USP | 30.7% |

The addition and mixing were continued until the CMC was uniformly wetted and had formed granular agglomerates. The quantity of agglomerating solution required will vary somewhat depending upon the particle size. The agglomerates were removed from the blender and dried and sieved through a 20 mesh screen. This product contains 15 percent by weight corn syrup solids in the finished product.

Using identical mixing conditions to prepare 1 percent solutions, the agglomerated CMC was compared with original CMC. The agglomerated product required approximately 8 minutes for complete solution (readily dispersible) while the original CMC required over 20 minutes (considerable lumping) for complete solution. The agglomerated product is free flowing without dusting.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. The method of forming a readily dispersible and dissoluble alcoholinsoluble hydrocolloid selected from the group consisting of alginic acid and water-soluble salts thereof, karaya, tragacanth, carrageen, guar and carboxymethyl cellulose which comprises thoroughly intermixing particles of said hydrocolloid with sufficient carbohydrate binder soluble in both water and alcohol and an aqueous alcoholic solvent to substantially coat the surface of said particles, said alcoholic solvent containing sufficient alcohol to prevent hydration of the hydrocolloid but insufficient alcohol to prevent dissolution of the binder, continuing said mixing until granules are formed, and drying the granules.

2. The method of claim 1 in which the aqueous alcoholic solvent contains approximately 25–30 percent alcohol by weight.

3. The method of claim 2 in which the carbohydrate binder constitutes from about 5 to about 95 percent by weight of the granules.

* * * * *